United States Patent
Takeuchi et al.

(10) Patent No.: US 8,908,780 B2
(45) Date of Patent: Dec. 9, 2014

(54) PROTECTIVE RELAY AND METHOD FOR CONTROLLING THE SAME

(75) Inventors: Atsushi Takeuchi, Inzai (JP); Masanori Shimada, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 839 days.

(21) Appl. No.: 13/126,958

(22) PCT Filed: Mar. 25, 2009

(86) PCT No.: PCT/JP2009/001340
§ 371 (c)(1),
(2), (4) Date: Apr. 29, 2011

(87) PCT Pub. No.: WO2010/050083
PCT Pub. Date: May 6, 2010

(65) Prior Publication Data
US 2011/0211619 A1 Sep. 1, 2011

(30) Foreign Application Priority Data
Oct. 31, 2008 (JP) ................................ 2008-280888

(51) Int. Cl.
*H04B 3/00* (2006.01)
*H02H 3/30* (2006.01)
*H04B 3/30* (2006.01)

(52) U.S. Cl.
CPC ... *H02H 3/30* (2013.01); *H04B 3/30* (2013.01)
USPC ............... 375/258; 375/257; 361/42; 361/80; 700/292

(58) Field of Classification Search
CPC ............ H04B 3/54; H04B 3/56; H04B 3/542; H04B 2203/5404; H04B 2203/5412; H04B 2203/5416; H04B 2203/5483; H04B 2001/0416; H04B 2203/5425; H04B 3/36; H04W 52/16; H04W 52/30; H04W 52/36; H02H 1/0061
USPC .................. 375/256, 258, 259, 296, 297, 257; 455/522, 523; 361/42, 80; 700/292
See application file for complete search history.

(56) References Cited

U.S. PATENT DOCUMENTS 5,818,372 A * 10/1998 Noro .............................. 341/131
2006/0142009 A1 * 6/2006 Takaki ........................... 455/436

FOREIGN PATENT DOCUMENTS

| JP | 5 30031 | 2/1993 |
| JP | 9 284227 | 10/1997 |

(Continued)

OTHER PUBLICATIONS

Korean Office Action issued Apr. 29, 2013, in Korea Patent Application No. 10-2011-7008251.

(Continued)

*Primary Examiner* — Sophia Vlahos
(74) *Attorney, Agent, or Firm* — Oblon, Spivak, McClelland, Maier & Neustadt, L.L.P.

(57) ABSTRACT

According to one embodiment, a protective relay performs the following steps. A/D converter 11 acquires an electric current of a power transmission line 4 via a CT 5. A computing part 12 performs various protection computations such as current differential computation using a current data measured at the end of itself and a current data measured at the opposite end. A transmitting and receiving circuit 13 transmits the current data of itself to the other protective relay 1 at the opposite end via a transmission path 3. A received level detection part 14 detects the received level of the transmission data that has been transmitted from the opposite end and received by the transmitting and receiving circuit 13. A transmission level control part 15, based on the difference between the received level that has been detected within a definite time t1 after the establishment of data transmission to the other protective relay 1 and a predetermined received level, performs transmission level reduction control after the passage of the definite time t1.

12 Claims, 6 Drawing Sheets

(56) References Cited

FOREIGN PATENT DOCUMENTS

| JP | 2000 165325 | | 6/2000 | | |
|----|-------------|---|--------|---|---|
| JP | 2001-60921 | | 3/2001 | | |
| JP | 2002 010477 | | 1/2002 | | |
| JP | 2004 88920 | | 3/2004 | | |
| JP | 2007-019663 | * | 1/2005 | ............... | H04B 3/54 |
| JP | 2005 341022 | | 12/2005 | | |
| KR | 10-0600980 | | 7/2006 | | |

OTHER PUBLICATIONS

International Search Report issued Jun. 16, 2009 in PCT/JP09/01340 filed Mar. 25, 2009.

* cited by examiner

PROTECTIVE RELAY AND METHOD FOR CONTROLLING THE SAME

FIELD

The present invention relates to a protective relay which gives and receives data between a plurality of protective relays to make a fault judgment on the inside and outside of a protected section.

BACKGROUND

Progress in the digitization of protective relays has been promoting the application of a current differential protection principle, in which data communication is made by using a transmission path, to the power transmission line protection. In the current differential protection, a method for transmitting a sampled instantaneous value of an amount of electric current, has mainly been applied, but the method increases transmission capacity, as a result, it is required that a transmission path has, for example, a transmission rate of 1.544 Mbps. On the other hand, as a method to which a low speed general purpose transmission path is applicable, a current differential protective relay as disclosed in Patent Document 1, has been developed. The use of this method allows the application of a digital current differential protective relay that uses an existing pilot wire as a transmission path, and is promoting the replacement of existing analog pilot wire relays by digital current differential protective relays.

When a current differential protective relay is applied by using an existing pilot wire as a transmission path, since another system also uses an existing pilot wire as a transmission path, as shown in FIG. 7, there is a case in which protective relays 1 and other systems 2 (for example, remote monitoring and control system) share respective cores in one pilot wire cable used as a transmission path 3. Here, strictly speaking, the respective transmission paths 3 used for the protective relays 1 and the other systems 2 are different cores in the one pilot wire cable. Since in one pilot wire cable, a plurality of cores are very close to each other in position, the respective transmission paths 3 used for the protective relays 1 and the other systems 2 are substantially very close to each other in position. In such a case, it is required to consider, for example, adjustment of transmission level for the purpose of preventing the transmission of the protective relays 1 from interfering with the transmission of the other systems 2 on a transmission path to cause communication problems.

In a general transmission system, as an example of adjustment of transmission level, there are techniques as mentioned in Patent Document 2 and Patent Document 3.

Patent document 1: Japanese Patent Application Laid-open No. 2004-88920
Patent document 2: Japanese Patent Application Laid-open No. 2005-341022
Patent document 3: Japanese Patent Application Laid-open No. H05-30031 (No. 1993-30031)

As shown in FIG. 7, when protective relays 1 and other systems 2 such as monitoring and control system are configured by using cores in one pilot wire cable 3, it is required that the transmission level in transmission of the protective relays 1 is reduced to some extent so as not to cause communication problems in the other systems 2 under the influence of the transmission of the protective relays 1. However, since the conditions for transmission varies depending on the distance or the like of the pilot wire, it is impossible to fix in advance the transmission level.

As one method for adjusting the transmission level, the method of Patent Document 2 embeds a specific code into a signal to be transmitted to multiplex the signal, calculates attenuation in the transmission level from the transmission delay of the signal, the length of transmission line, and so on, and adjusts the transmission level. The method of Patent Document 2, when the duty value is low on the receiver side in optical communication, increases the transmission level and increases the margin of the received level. Both of these methods are directed to securing the transmission quality of the system itself, and not directed to preventing the influence on the other system when both systems use one pilot wire or the like.

SUMMARY

The present invention was proposed so as to solve the problems with conventional technology mentioned above, and has as an object the provision of a protective relay and a method for controlling the same, which can appropriately and automatically adjust the transmission level of data transmission so as not to influence on another system that uses a transmission path adjacent to that of the protective relay system itself.

As a first aspect of protective relay according to the present invention, there is provided a protective relay which performs data transmission by a transmitting and receiving circuit between the protective relay itself and another protective relay provided at an opposite end of a protected section via a transmission path, to make a fault judgment on the inside and outside of the protected section. The protective relay has a received level detection part which detects the received level of a data received by the transmitting and receiving circuit, and a transmission level control part. The transmission level control part compares a received level detected within a definite period of time set in advance, just after a data transmission has been established between the protective relay itself and the other protective relay at the opposite end via the transmission path, with a predetermined level set in advance. When the received level within the definite period of time is larger than the predetermined level, the transmission level control part performs a transmission level reduction control that reduces the transmission level of data transmission performed by the transmitting and receiving circuit.

The protective relay according to the first aspect is devised as a result of focusing on the fact that the transmission level and the received level are generally the same between protective relays at the both ends of the protected section just after a data transmission has been established between the protective relays. In other words, the conditions of a transmission path between the protective relays at the both ends, are generally the same in both directions, and in particular, when a pilot wire is used, transmission information and received information are alternately transmitted via one transmission path. As a result, within a definite period of time just after a data transmission has been established between the protective relays at the both ends, the transmission level and the received level are generally the same between protective relays at the both ends. On this premise, with the protective relay according to the first aspect, the received level, which is detected within a definite period of time just after a data transmission has been established between the protective relays at the both ends, is used for each of the protective relays, and when the value of the utilized level is larger than the predetermined level, the transmission level control part can perform a control that reduces the transmission level. This allows the transmission level of the protective relays at the both ends to be reduced approximately at the same time, and eliminates influence on another system (such as remote monitoring and control system) that uses a transmission path adjacent to that of the protective relay system. The protective relay according to the first aspect is, in terms of data to be used, a method of using as a substitute data the received level at which a data transmitted from the other protective relay has been received at the protective relay itself, as a result of the use of such a real data instead of a real data of the received level at which a data transmitted from the protective relay itself was received at the other protective relay. The use of such a substitute data allows a timing of performing a transmission level control to be limited to a definite period of time just after a data transmission has been established, that is, within a period of time in which the transmission level and the received level are the same.

As a second aspect of protective relay according to the present invention, there is provided a protective relay which performs data transmission by a transmitting and receiving circuit between the protective relay itself and another protective relay provided at an opposite end of a protected section via a transmission path, to make a fault judgment on the inside and outside of the protected section. The protective relay has a received level detection part which detects the received level of a data received by the transmitting and receiving circuit, a transmission data control part, an opposite end received level detection part, and a transmission level control part. The transmission data control part performs data control such that a data to be transmitted by the transmitting and receiving circuit includes the received level of the protective relay itself that has been detected. The opposite end received level detection part detects the received level of the other protective relay at the opposite end that is included in a data received by the transmitting and receiving circuit. The transmission level control part, when the received level of the opposite end that has been detected is larger than a predetermined level set in advance, performs a transmission level reduction control that reduces the transmission level of data transmission performed by the transmitting and receiving circuit.

The protective relay according to the second aspect is different from the protective relay according to the first aspect in its technical feature that it allows a data to include the received level when the data is transmitted and received. This feature allows the protective relay according to the second aspect to receive a data that includes the received level of the other protective relay at the opposite end, to thereby allow each protective relay to acquire the received level at which a data transmitted from the protective relay itself was received by the other protective relay. As a result, depending on the real received level at the other protective relay, the transmission level of a data transmitted from the protective relay itself can be appropriately adjusted such that the received level of the other protective relay is put at a predetermined level. The protective relay according to the second aspect, uses a real data of the received level at which a data transmitted from the protective relay itself was received at the other protective relay. Unlike the protective relay of the first aspect using as a substitute data the received level at which a data transmitted from the other protective relay has been received at the protective relay itself, as a result of the use of such a real data, it is unnecessary to limit a timing of performing a transmission level control to a definite period of time just after a data transmission has been established. Consequently, a transmission level control can be performed more appropriately.

In addition, as another aspect of the present invention, there is provided a method for controlling transmission level of protective relay which is a result of grasp the technical features of the protective relays mentioned above in terms of method.

By means of the present invention, a protective relay and a method for controlling the same can be provided, which can appropriately and automatically adjust the transmission level of data transmission so as not to influence on another system that uses a transmission path adjacent to that of the protective relay system itself.

DETAILED DESCRIPTION

Figure 1:
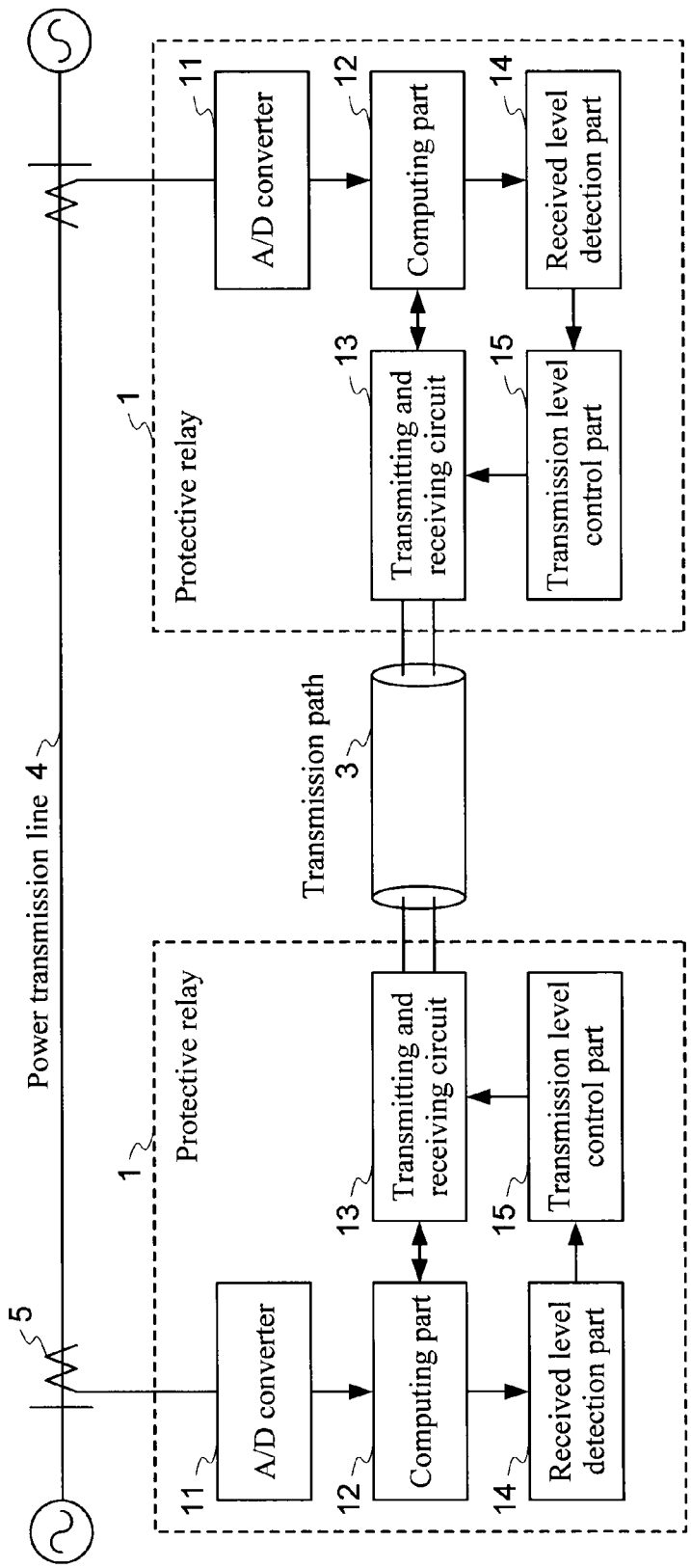
FIG. 1 is a block diagram showing a configuration of a protective relay according to a first embodiment of the invention.

Below, a plurality of embodiments of protective relay according to the invention, which are applied to the power transmission line protection, are specifically explained referring to the drawings.

First Embodiment

FIG. 1 is a block diagram showing a configuration of a protective relay according to a first embodiment of the invention. As shown in FIG. 1, at the both ends of a power transmission line 4 as a protected section, protective relays 1, which have the same configuration as each other, are respectively provided. The protective relay 1 has an analog/digital (A/D) converter 11, a computing part 12, a transmitting and receiving circuit 13, a received level detection part 14, and a transmission level control part 15. The protective relay 1 operates in the following manner.

First, the analog/digital (A/D) converter 11 takes in an electric current data via a current transformer (CT) 5 and converts the analog data of current into a digital data to enter it into the computing part 12. The computing part 12 gives a current data of the protective relay itself to the transmitting and receiving circuit 13, and takes in a current data of the other protective relay at an opposite end, which has been received by the transmitting and receiving circuit 13, to perform various protection computations such as current differential computation. The transmitting and receiving circuit 13 transmits the current data of the protective relay itself as a transmission data to the other protective relay 1 at the opposite end via a transmission path 3. These handling steps of current data performed by the A/D converter 11, the computing part 12, and the transmitting and receiving circuit 13, are basic operations in the protective relay.

The protective relay 1 according to this embodiment, in addition to the basic operations, performs characteristic operations mentioned below. First, the received level of a transmission data from the other protective relay at the opposite end when the data has been received by the transmitting and receiving circuit 13, is detected by the received level detection part 14, and the detected received level is given to the transmission level control part 15. The transmission level control part 15, based on the difference between the detected received level and a predetermined level that has been set in advance for received level, performs transmission level reduction control.

When performing the transmission level reduction control, the transmission level control part 15 adjusts so as to reduce the transmission level using a detected received level that has been detected within a definite period of time "t1", which has been set in advance, just after a data transmission has been established between the protective relay itself and the other protective relay at the opposite end, to thereby allow the protective relays 1 to reduce the transmission level at the same time. Here, the detected received level used for comparison with the predetermined received level is detected within the definite period of time "t1" just after a data transmission has been established, as a result, the adjustment of reducing the transmission level is performed after the definite period of time "t1" has passed from the point of time at which the data transmission has been established.

Note that a specific predetermined received level can be appropriately selected within a range (measured range or estimated range) in which the transmission of the protective relay system does not substantially influence the transmission of another system, depending on relative position of the transmission paths between the systems in relation to the specific transmission path 3, and within a range (measured range or estimated range) in which the performance of the protective relay 1 does not deteriorate. In addition, a specific definite period of time "t1" is set depending on a period of time (measured time or estimated time) in which the transmission level and the received level are the same between the protective relays just after a data transmission has been established. These measured values or estimated values, which are used for setting the predetermined received level or the definite period of time "t1", can be acquired by a statistical method or the like using measured data that have been measured in the field or past data that have been acquired in the past.

With the first embodiment mentioned above, the following action and effect can be achieved. The received level, which is detected within a definite period of time just after a data transmission has been established between the protective relays 1 at the both ends, is used for each of the protective relays, and when the value of the utilized level is larger than the predetermined level, the transmission level control part can perform a control that reduces the transmission level. This allows the transmission level of the protective relays at the both ends to be reduced approximately at the same time, and eliminates influence on another system (such as remote monitoring and control system) that uses a transmission path adjacent to that of the protective relay system. Consequently, a protective relay and a method for controlling the same can be provided, which can appropriately and automatically adjust the transmission level of data transmission so as not to influence on another system that uses a transmission path adjacent to that of the protective relay system itself.

The protective relay according to the first embodiment is, in terms of data to be used, a method of using as a substitute data the received level at which a data transmitted from the other protective relay has been received at the protective relay itself, as a result of the use of such a real data instead of a real data of the received level at which a data transmitted from the protective relay itself was received at the other protective relay. The use of such a substitute data allows a timing of performing a transmission level control to be limited to a definite period of time just after a data transmission has been established, that is, within a period of time in which the transmission level and the received level are the same.

Second Embodiment

Figure 2:
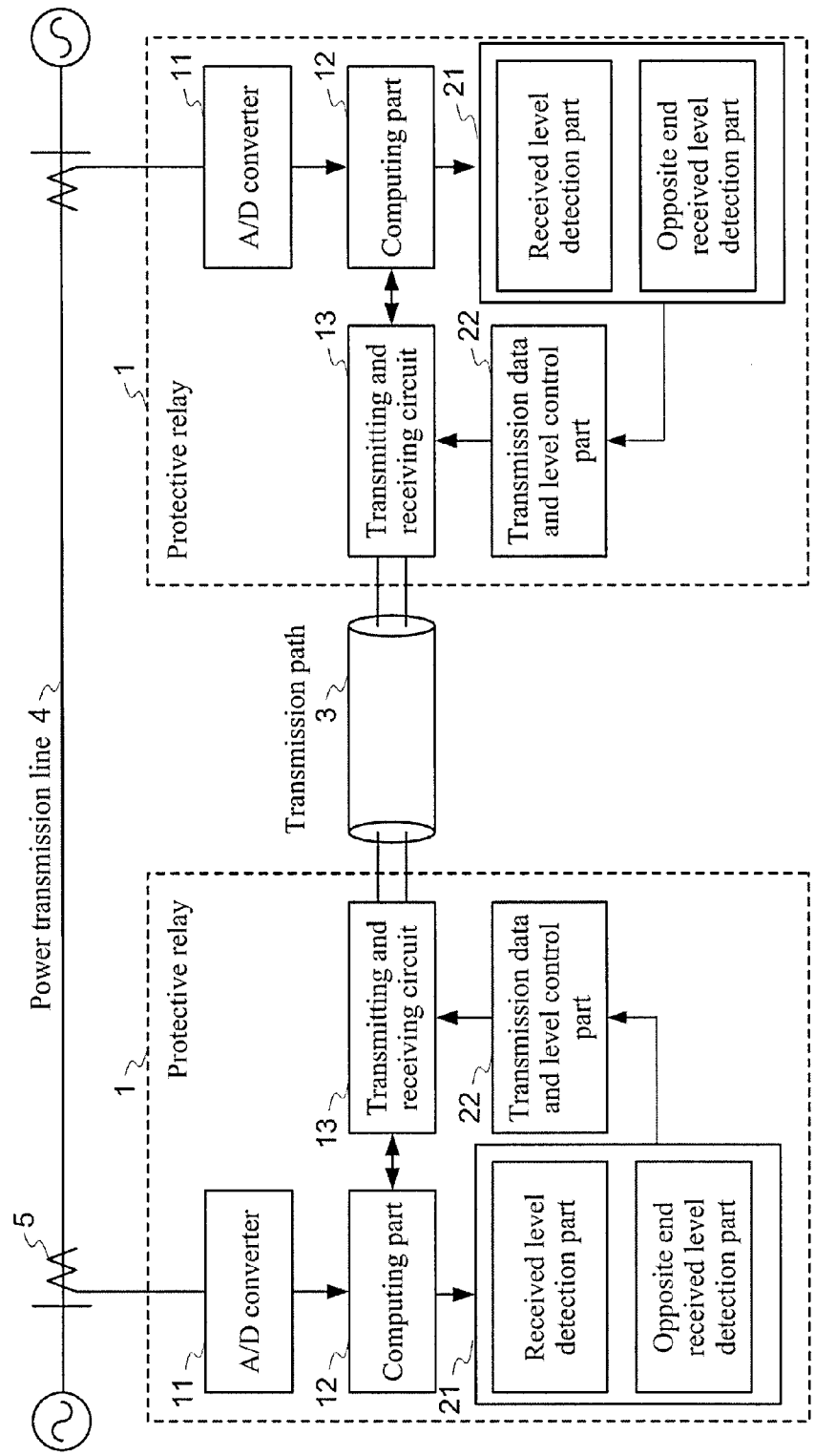
FIG. 2 is a block diagram showing a configuration of a protective relay according to a second embodiment of the invention.

FIG. 2 is a block diagram showing a configuration of a protective relay according to a second embodiment of the invention. As shown in FIG. 2, the protective relay of this embodiment has a both end received level detection part 21 and a transmission data and level control part 22 instead of the received level detection part 14 and the transmission level control part 15 in the protective relay 1 shown in FIG. 1. Note that the other configuration is the same as that of the protective relay 1 shown in FIG. 1.

In the protective relay 1 of this embodiment, the basic operations performed by the A/D converter 11, the computing part 12, and the transmitting and receiving circuit 13, are the same as those of the protective relay shown in FIG. 1. The protective relay 1 of this embodiment performs characteristic operations mentioned below.

First, the received level of a transmission data from the other protective relay at the opposite end when the data has been received by the transmitting and receiving circuit 13, is detected by the both end received level detection part 21, and the detected received level is given to the transmission data and level control part 22. The transmission data and level control part 22 adds the detected received level to a transmission data to be transmitted from the transmitting and receiving circuit 13. As a result, a data that includes the received level of its end in addition to the current data of its end is transmitted as a transmission data to the other protective relay 1 at the opposite end.

As mentioned above, when a data including the received level of its end has been transmitted to the destination, the transmitting and receiving circuit 13 of the destination receives the transmission data from the opposite end to acquire the received level, at which a transmission data from its end was received at the opposite end, as well as the current data of the opposite end. The received level of the opposite end is detected by the both end received level detection part 21 and given to the transmission data and level control part 22. The transmission data and level control part 22, based on the difference between the detected received level of the opposite end and a predetermined level that has been set in advance for received level, performs transmission level reduction control.

With the second embodiment mentioned above, the following action and effect can be achieved. Since the protective relay 1 receives a data that includes the received level of the other protective relay 1 at the opposite end, each protective relay 1 can acquire the received level at which a data transmitted from the protective relay itself was received by the other protective relay. As a result, depending on the real received level at the other protective relay, the transmission level of a data transmitted from the protective relay itself can be appropriately adjusted such that the received level of the other protective relay is put at a predetermined level.

The protective relay of the second embodiment, uses a real data of the received level at which a data transmitted from the protective relay itself was received at the other protective relay. Unlike the protective relay of the first embodiment using as a substitute data the received level at which a data transmitted from the other protective relay has been received at the protective relay itself, as a result of the use of such a real data, it is unnecessary to limit a timing of performing a transmission level control to a definite period of time just after a data transmission has been established. Consequently, a transmission level control can be performed more appropriately.

{Method of Determining a Specific Transmission Level Adjustment Value in First and Second Embodiment}

In the protective relays 1 shown in FIG. 1 and FIG. 2, as a method of determining a specific transmission level adjustment value by the transmission level control part 15 or the transmission data and level control part 22, there are methods such as the use of the level ratio of a predetermined level to a detected received level, and the use of a plurality of setting values. These methods will be sequentially explained below.

{Method of Using a Level Ratio}

When a detected received level is "Rn", a predetermined level (desired value) that has been set in advance for received level is "Rm", a transmission level before level reduction adjustment is "Sn", and a transmission level after level reduction adjustment is "Sm", the value "Sm" is determined by the following expression (1).

$$Sm = Sn \times Rm/Rn \quad (1)$$

The use of a new transmission level adjusted to the value "Sm" that has been determined by the expression (1), when a transmission level control is performed only once, this allows the received level of the other protective relay to get closer to the desired value "Rm".

{Method of Using a Plurality of Setting Values}

Figure 3:
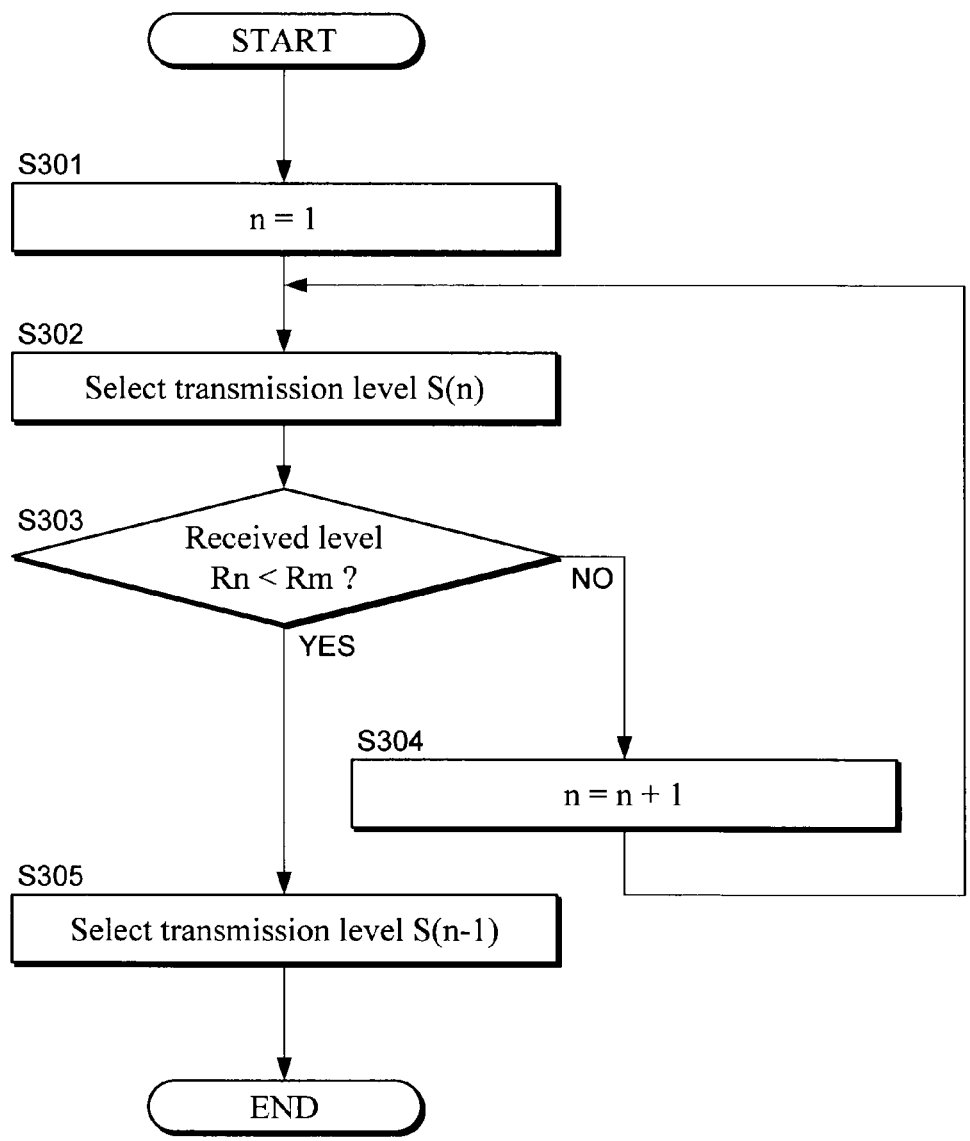
FIG. 3 is a flowchart showing an example of method of calculating a transmission level adjustment value using a plurality of setting values in the protective relay shown in FIG. 1 or FIG. 2.

FIG. 3 is a flowchart showing an example of method of calculating a transmission level adjustment value using a plurality of setting values. In this method, the following m setting values S(n) of transmission level are set in advance.
S(n)=(S1, S2, S3, ..., Sm)

Here, the m setting values are set in descending order as follows.
S1>S2>S3> ..., >Sm In this method, when a detected received level is "Rn" and a predetermined level (desired value) that has been set in advance for received level is "Rm", the value S(n) of transmission level is started at S1 and subsequently updated with incrementing n by one, a comparison is performed between the detected received level "Rn" and the desired received level "Rm".

In other words, as shown in FIG. 3, first, n=1 is set (S301), and subsequently, the transmission level S(n) is selected (S302), when the detected received level "Rn" is larger than the desired received level "Rm" (No in S303), n is incremented by one (S304) and the transmission level is changed into another setting value that is lower than that of this time by one rank (S302). This change is successively repeated, and when the detected received level "Rn" has become smaller than the desired received level "Rm", the transmission level is changed into the last setting value S(n−1) that is higher than that of this time by one rank (S305), the process ends.

As a result of this, within a range in which the received level is not lower than the desired received level "Rm", the minimum transmission level can be selected. Consequently, the influence on another system can be eliminated, and moreover, the received level required for performance assurance of protective relay can be secured. In this method, the stepwise change of the transmission level can be performed by simply selecting of setting values set in advance, and can be implemented in a simple circuit.

Third Embodiment

Figure 4:
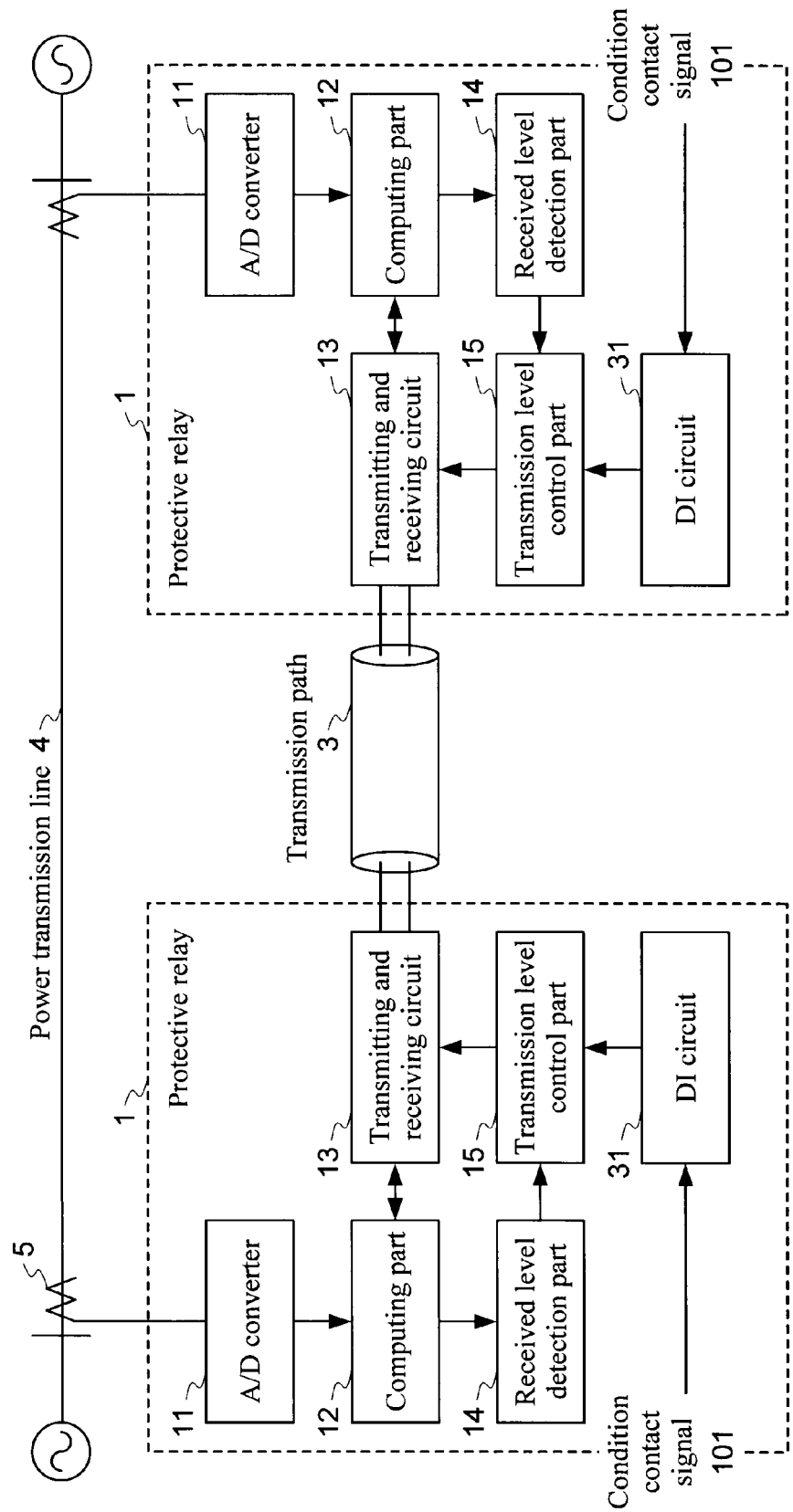
FIG. 4 is a block diagram showing a configuration of a protective relay according to a third embodiment of the invention.

FIG. 4 is a block diagram showing a configuration of a protective relay according to a third embodiment of the invention. As shown in FIG. 4, the protective relay 1 of this embodiment has a digital input (DI) circuit 31 in addition to the configuration of the protective relay 1 shown in FIG. 1. Note that the other configuration is the same as that of the protective relay 1 shown in FIG. 1.

In the protective relay 1 of this embodiment, the basic operations performed by the A/D converter 11, the computing part 12, and the transmitting and receiving circuit 13, and the characteristic operations performed by the received level detection part 14 and the transmission level control part 15, are the same as those of the protective relay 1 shown in FIG. 1. In the protective relay 1 of this embodiment, the DI circuit 31 performs characteristic operations mentioned below.

The DI circuit 31 allows the transmission level control part 15 to perform a transmission level reduction control only when a condition contact signal 101 set in advance has been input, and prohibits the transmission level control part 15 from performing a transmission level reduction control when a condition contact signal 101 has not been input. Here, the condition contact signal 101 can be obtained by connecting the protective relay with a contact and inputting a signal of the contact, which is, for example, a communication fault alarm contact of an external remote monitoring and control system that uses a transmission path adjacent to the transmission path 3, or, a switch of transmission level reduction control command that is operated by human beings.

With this embodiment, since a transmission level reduction control is performed on the condition that a condition contact signal 101 is input, the condition contact signal 101 input at any time from another external system or the protective relay itself, allows a transmission level reduction control to be performed at any timing.

For example, when a signal from a switch of transmission level reduction control command is input by human beings, even if one transmission level reduction control performed based on the received level is insufficient to reduce the transmission level, a condition contact signal 101 input from a switch of an external system or the protective relay itself by human beings, an additional transmission level reduction control can be performed repeatedly. In addition, a configuration adapted so as to input a signal from a contact of another system that uses an adjoining transmission path, allows a transmission level reduction control to be performed only when the transmission level reduction control is required due to occurrence of communication fault or the like in the other system. This can prevent a transmission level reduction control performed to no purpose. In other words, the reduction of the transmission level due to the change of transmission level can be limited to a level at which the other system that uses an adjoining transmission path, has been free from the influence.

{Method of Changing Transmission Level when a Condition Contact Signal is Input in Third Embodiment}

The protective relay 1 shown in FIG. 4, may set m setting values (S1, S2, S3, ..., Sm) in advance as transmission level, and stepwise change the transmission level as shown in FIG. 3 when a condition contact signal 101 has been input.

Figure 5:
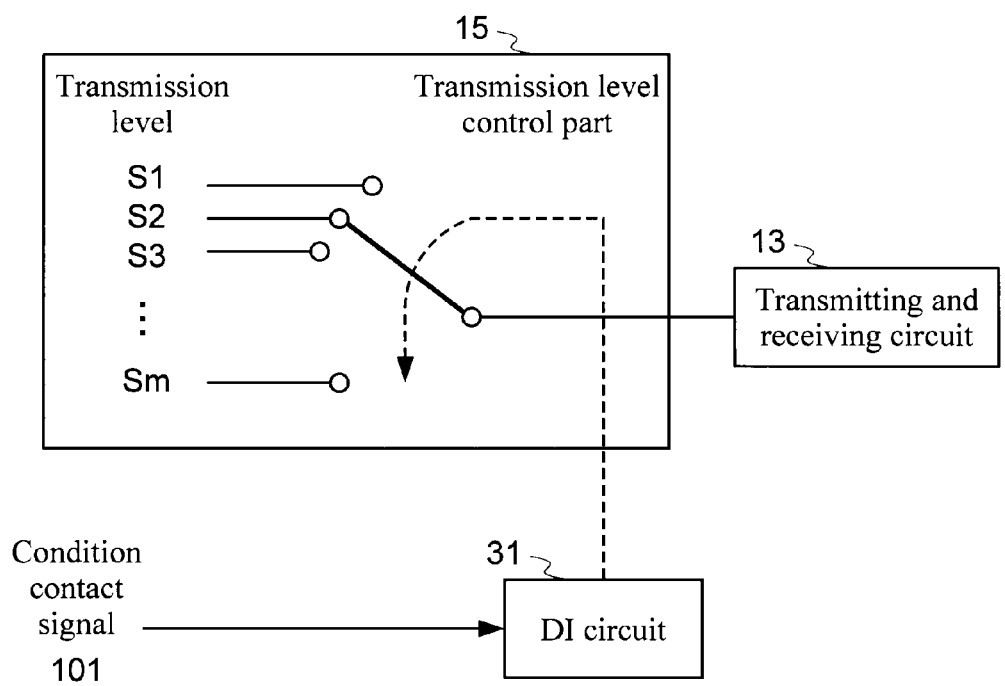
FIG. 5 is a conceptual view showing an image of method of stepwise changing the transmission level using a plurality of setting values in the protective relay shown in FIG. 4.

FIG. 5 is a conceptual view showing an image of method of allowing the transmission level control part 15 to stepwise change the transmission level in response to a signal (denoted by a dashed line arrow in FIG. 5) from the DI circuit 31 when a condition contact signal 101 has been input.

When the protective relay having this configuration is connected with a communication fault alarm contact of an external remote monitoring and control system that uses an adjoining transmission path and inputs from a signal of the communication fault alarm contact as condition contact signal 101, the change of the transmission level for reducing the transmission level can be stepwise performed only when a communication fault alarm has occurred. After that, when a normal status has been restored from the communication fault alarm, this can prevent the change of the transmission level performed to no purpose, to thereby prevent the reduction the transmission level to a lower level than necessary.

Figure 6:
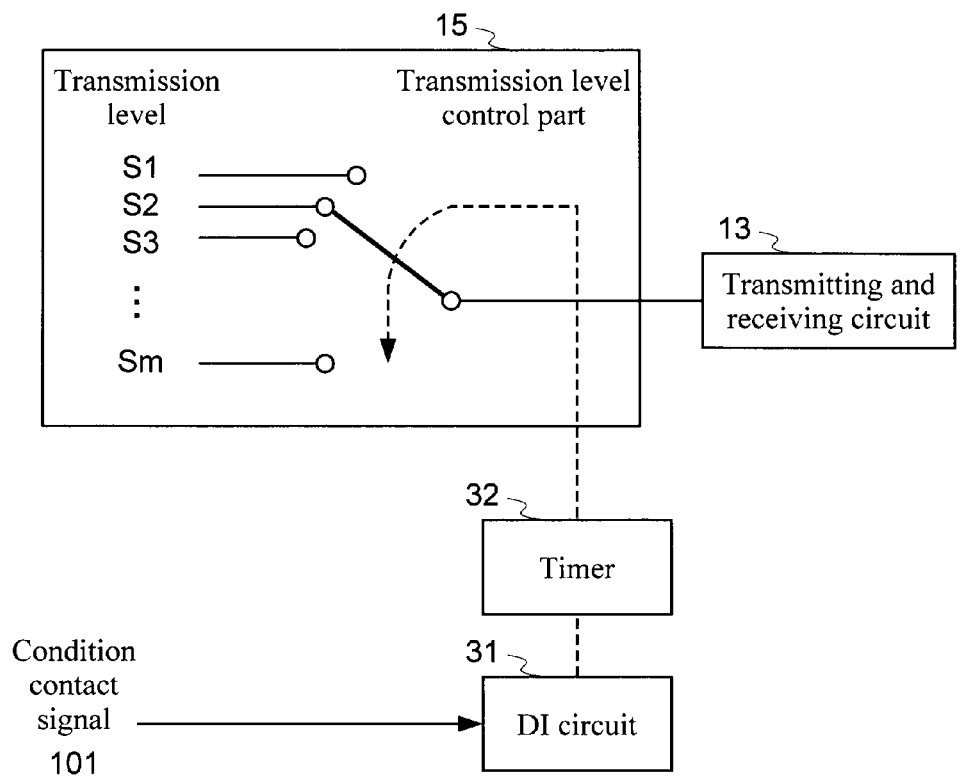
FIG. 6 is a conceptual view showing an image of method in which a timer is added to the configuration shown in FIG. 5.
Figure 7:
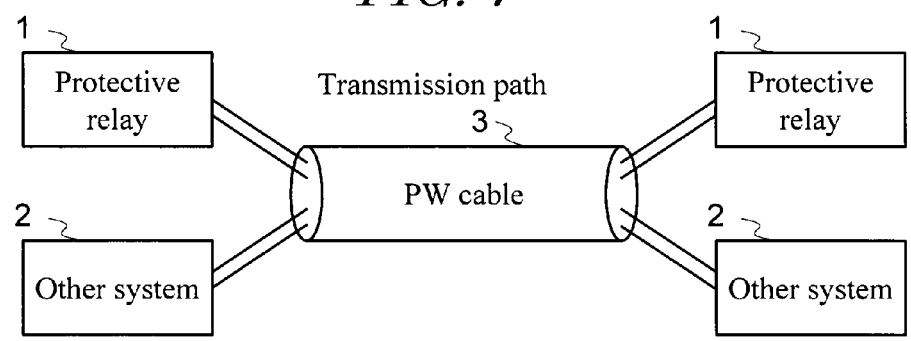
FIG. 7 is a view showing an example in which protective relays and other systems share respective cores in one pilot wire cable used as a transmission path.

FIG. 6 shows a configuration in which a timer 32 is added to the configuration shown in FIG. 5, for check a definite period of time t2 when inputting as the condition contact signal 101 a signal from a contact, which is continuously closed while an alarm is occurring, by the DI circuit 31.

With this configuration, after the timer 32 has checked whether the continuous time of the input of the condition contact signal 101 has been equal to or more than the definite period of time t2, one step of the change of the transmission level is performed to allow the transmission level to be reduced by one rank. After this, when the condition contact signal 101 is continuously input, one step of the change of the transmission level is performed at each definite period of time t2.

Note that the definite period of time t2 requires that it should be a value with a margin in addition to a period of time which passes from one step of the transmission level reduction control was performed to allow the received level to be reduced, till a normal status is restored from alarm.

With such a method of using the timer 32, one step of the change of the transmission level is performed at each definite period of time t2 only when an alarm is continuous, to thereby prevent the reduction the transmission level to a lower level than necessary. Here, when taking account of an upper limit of the level at which another system that uses an adjoining transmission path, is free from the influence, the reduction of the transmission level is limited to a range of the level reduction for one step in relation to the upper limit of the level.

Other Embodiment

Note that the present invention is not limited to the embodiments mentioned above. The scope of the present invention includes various modifications. In other words, the system configurations shown in the figures are examples that show the minimum functional configuration for implementing a protective relay according to the present invention. A specific system configuration, hardware configuration, and software configuration may be appropriately selected.

For example, the both end received level detection part and the transmission data and level control part may be independent for each function. In other words, the both end received level detection part may be separated into two individual received level detection parts which are independent each other for detecting the end itself and the opposite end, respectively. In addition, the transmission data and level control part may be separated into a transmission data control part for adding a received level to a transmission data, and a transmission level control part for controlling the transmission level, which are independent each other. On the other hand, the received level detection part and the transmission level control part may be unified to be a single functional part.

The invention claimed is:

1. A protective relay provided at one end of a protective section for performing data transmission with another protective relay provided at an opposite end of the protected section via a transmission path to make a fault judgment on the inside and outside of the protected section, the protective relay comprising:

a transmitting and receiving circuit transmitting data to the another protective relay and receiving data from the another protective relay;

a receiving level detection block detecting a receiving level of the protective relay that is a receiving level of the data from the another protective relay at the transmitting and receiving circuit; and a transmission level control block comparing the receiving level of the protective relay detected within a definite period of time with a predetermined level, the definite period of time being a period just after the data transmission has been established between the protective relay and the another protective relay and in which the receiving level and the transmission level of the protective relay become the same as a receiving level and a transmission level of the another protective relay, and when the receiving level of the protective relay within the definite period of time is larger than the predetermined level, the transmission level control block performing a transmission level reduction control that reduces the transmission level of the transmitting and receiving circuit.

2. The protective relay according to claim 1, wherein:

the transmission level reduction control is performed in accordance with the following equation:

$$Sm = Sn \times Rm/Rn$$

where Rn denotes the receiving level of the protective relay, Rm denotes the predetermined level, Sn denotes the transmission level before level reduction adjustment, and Sm denotes the transmission level after level reduction adjustment.

3. The protective relay according to claim 1, wherein:

the transmission level reduction control uses a plurality of setting values that are stepwise set in advance as setting values of the transmission level, and selects a value of the transmission level from the plurality of setting values such that the receiving level of the protective relay becomes a smallest value above the predetermined level.

4. The protective relay according to claim 1, further comprising:

a condition signal input block allowing the transmission level control block to perform the transmission level reduction control only when a condition signal set in advance has been input.

5. The protective relay according to claim 4, wherein:

the transmission level reduction control uses a plurality of setting values that are stepwise set in advance as setting values of the transmission level, and when the condition signal has been input by the condition signal input block, changes a value of the transmission level among the plurality of setting values.

6. A protective relay provided at one end of a protective section for performing data transmission with another protective relay provided at an opposite end of the protected section via a transmission path to make a fault judgment on the inside and outside of the protected section, the protective relay comprising:
- a first receiving level detection block detecting a receiving level of the protective relay that is a receiving level of data from the another protective relay at the transmitting and receiving circuit;
- a transmitting and receiving circuit transmitting data to the another protective relay and receiving data from the another protective relay, the data to be transmitted to the another protective relay including the receiving level of the protective relay detected by the first receiving level detection block and the data from the another protective relay including a receiving level of the another protective relay detected by the another protective relay;
- a transmission data control block performing data control such that the data to be transmitted by the transmitting and receiving circuit includes the receiving level of the protective relay detected by the first receiving level detection block;
- a second receiving level detection block detecting the receiving level of the another protective relay included in the data from the another protective relay; and
- a transmission level control block which, when the receiving level of the another protective relay is larger than a predetermined level, performs a transmission level reduction control that reduces the transmission level of the transmitting and receiving circuit.

7. The protective relay according to claim 6, wherein:
the transmission level reduction control is performed in accordance with the following equation:

$$Sm = Sn \times Rm / Rn$$

where Rn denotes the receiving level of the protective relay, Rm denotes the predetermined level, Sn denotes the transmission level before level reduction adjustment, and Sm denotes the transmission level after level reduction adjustment.

8. The protective relay according to claim 6, wherein:
the transmission level reduction control uses a plurality of setting values that are stepwise set in advance as setting values of the transmission level, and selects a value of the transmission level from the plurality of setting values such that the receiving level of the another protective relay becomes a smallest value above the predetermined level.

9. The protective relay according to claim 6, further comprising:
a condition signal input block allowing the transmission level control block to perform the transmission level reduction control only when a condition signal set in advance has been input.

10. The protective relay according to claim 9, wherein:
the transmission level reduction control uses a plurality of setting values that are stepwise set in advance as setting values of the transmission level, and when the condition signal has been input by the condition signal input block, changes a value of the transmission level among the plurality of setting values.

11. A method for controlling transmission level of a protective relay provided at one end of a protective section and performing data transmission with another protective relay provided at an opposite end of the protected section via a transmission path to make a fault judgment on the inside and outside of the protected section, the method comprising:
- transmitting data to the another protective relay and receiving data from the another protective relay by a transmitting and receiving circuit of the protective relay;
- detecting a receiving level of the protective relay that is a receiving level of the data from the another protective relay at the transmitting and receiving circuit; and
- comparing the receiving level of the protective relay detected within a definite period of time set with a predetermined level, the definite period of time being a period just after the data transmission has been established between the protective relay and the another protective relay and in which the receiving level and the transmission level of the protective relay become the same as a receiving level and a transmission level of the another protective relay, and when the received level within the definite period of time is larger than the predetermined level, performing a transmission level reduction control that reduces the transmission level the transmitting and receiving circuit.

12. A method for controlling transmission level of protective relay provided at one end of a protective section for performing data transmission with another protective relay provided at an opposite end of the protected section via a transmission path to make a fault judgment on the inside and outside of the protected section, the method comprising:
- detecting a receiving level of the protective relay that is a receiving level of data from the another protective relay at the transmitting and receiving circuit;
- transmitting data to the another protective relay and receiving data from the another protective relay, the data to be transmitted to the another protective relay including the receiving level of the protective relay and the data from the another protective relay including a receiving level of the another protective relay detected by the another protective relay;
- controlling the data to be transmitted by the transmitting and receiving circuit such that the data includes the receiving level of the protective relay;
- detecting the receiving level of the another protective relay included in the data from the another protective relay; and
- performing, when the receiving level of the another protective relay is larger than a predetermined level, a transmission level reduction control that reduces the transmission level of the transmitting and receiving circuit.

* * * * *